Dec. 10, 1968
E. A. HAWK, SR
3,415,449
POWDER SPRAY TORCH WITH EXPLOSION-PROOF HOPPER CONSTRUCTION
Filed April 27, 1966
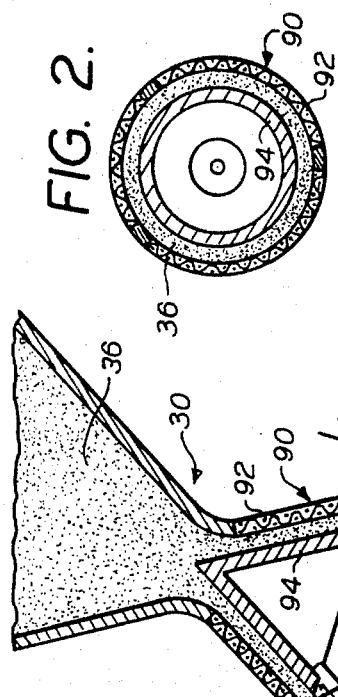
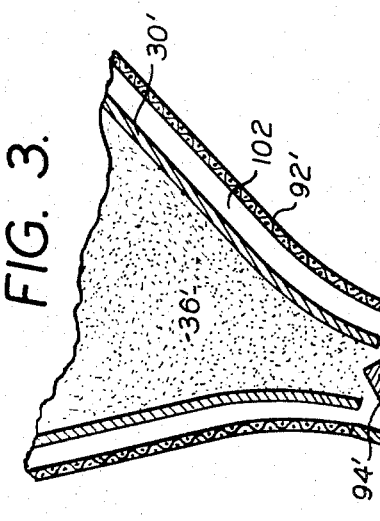
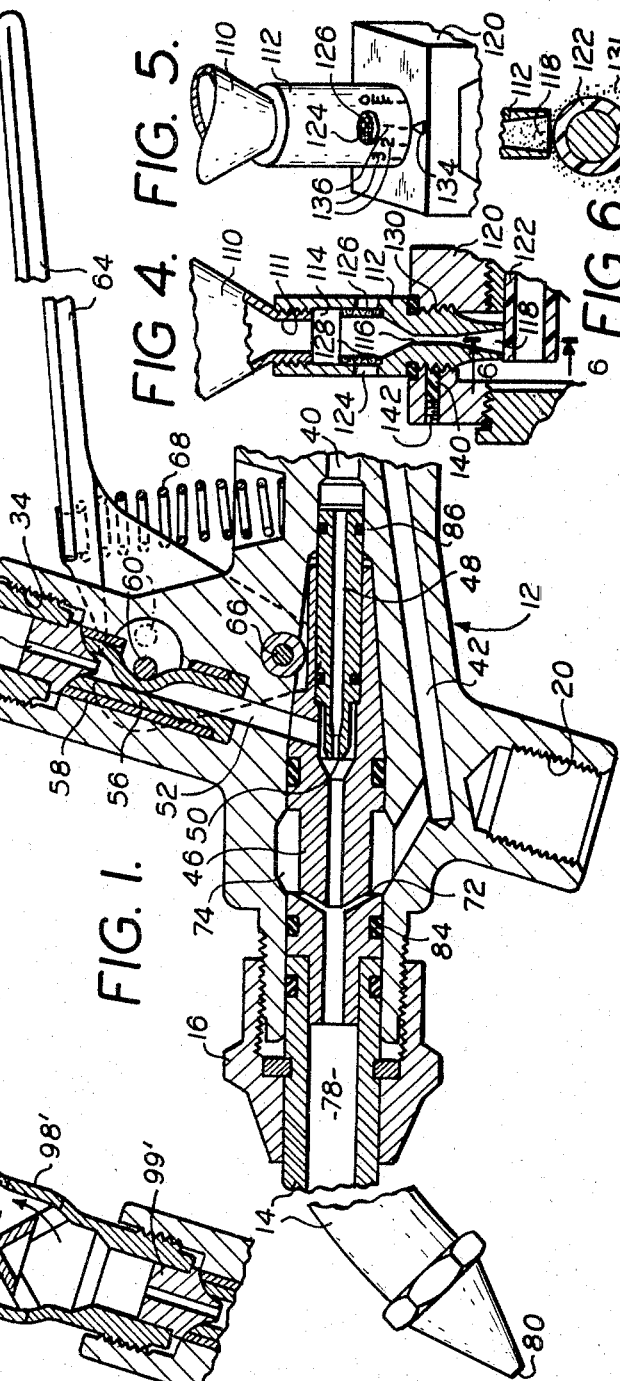
INVENTOR
Elvin A. Hawk, Sr.
BY
ATTORNEYS.

United States Patent Office 3,415,449
Patented Dec. 10, 1968

3,415,449
POWDER SPRAY TORCH WITH EXPLOSION-PROOF HOPPER CONSTRUCTION
Elwin A. Hawk, Sr., East Rochester, Ohio, assignor to Coast Metals, Inc., Little Ferry, N.J., a corporation of Delaware
Filed Apr. 27, 1966, Ser. No. 545,742
12 Claims. (Cl. 239—85)

ABSTRACT OF THE DISCLOSURE

A torch, for supplying powdered metal to a heated surface through the flame of the torch, supplies the powder to the interior of the torch through a passage that makes the hopper explosion-proof. The powder passage has a fine mesh screen extending around most of the circumferential angular extent of the passage to provide a large area for rapid escape of gas pressure if any such pressure builds up within the torch, but the screen stops escape of powder from the passage.

Background and summary of the invention

This invention relates to torches for applying powdered material, such as hard-surfacing metals, to a surface that is heated by the torch. The invention relates more particularly to torches of the type that supply the powder from a hopper to the interior of the torch for discharge with the gases through the flame system of the torch.

It is an object of the invention to provide an improved torch of the character indicated, and to prevent a pressure surge within the torch, such as may result from a flashback, from blasting the powder out of the hopper.

A blast which blows the contents from the hopper and over everything in the vicinity of the torch is dreaded by persons using torches that spray powdered metal through their flame systems; and it is an object of this invention to provide a torch construction that makes such blasts impossible so that a person can work with the torch free of any fear that some mishap in the use of the torch may cause a flashback or otherwise set off a blast back into the hopper.

The invention provides for the escape of back pressure before it reaches the hopper; and does so without any additional controls on the torch, and leaves the torch so that it is manipulated in exactly the same way as other torches for the purpose.

Other objects, features and advantages of the invention will appear or be pointed out as the description proceeds.

Brief description of the drawings

In the drawing, forming a part hereof, in which like reference characters indicate corresponding parts in all the views:

FIGURE 1 is a sectional view showing a torch made in accordance with this invention;

FIGURE 2 is a sectional view taken on the line 2—2 of FIGURE 1;

FIGURE 3 is a fragmentary sectional view showing a modified form of the invention;

FIGURE 4 is a fragmentary sectional view showing a modified form of the invention;

FIGURE 5 is a fragmentary isometric view of a portion of the structure shown in FIGURE 4; and FIGURE 6 is a sectional view on the line 6—6 of FIGURE 4.

Description of the preferred embodiments

The torch shown in FIGURE 1 includes a body 12 having a tip 14 connected to its forward end by a tip nut 16 which screws over threads 18 on the front end of the body 12. There is a threaded recess 20 at the underside of the body 12 for receiving a leg for supporting the torch when it is to be used with a support for holding it in a set relation to a workpiece.

A hopper 30 has a threaded lower end 32 that screws into another socket 34 in the top of the body 12. This hopper holds powder 36 which is fed into the torch by gravity and in response to operation of a valve which will be explained.

Within the body 12 there is a center passage 40 for oxygen or other combustion-supporting gas. There is another passage 42 for fuel gas. The oxygen passage 40 expands to a larger diameter along a taper into which a mixer 46 is inserted. Within the mixer 46 there is a bushing 48 having a nozzle 50 at its forward end.

This nozzle 50 is surrounded by an annular space into which a powder passage 52 opens. The powder passage extends through the upper part of the body 12 and through an opening in the mixer 46. Flow of oxygen from the nozzle 50 creates a partial vacuum in the annular space around the nozzle 50 and thus produces a suction on the powder passage 52.

A portion of the length of the powder passage 52 is lined with a flexible hose 56 held in a bushing 58. An operator or abutment 60 bears against the rearward side of the hose 56, there being an opening in the bushing 58 to provide access to the hose 56. This operator or abutment 60 is carried by a portion of a handle 64 which moves angularly about a fulcrum pin 66 anchored to the body 12.

A helical compression spring 68 urges the handle 64 upwardly into the position shown in FIGURE 1, and in this position the operator or abutment 60 pinches the hose 56 and shuts off flow of powder through the passage 52. When the handle 64 is depressed, the abutment 60 moves from the full-line to the dotted-line position; the house 56 expands to its full open section, and powder flows through the passage 52. The rate of powder flow can be controlled by the degree to which the handle 64 is depressed.

The mixer 46 has sloping passageways 72 leading from an annular chamber 74 into the center oxygen passage of the mixer. These sloping passageways 72 converge in the direction of the gas flow through the center passage and fuel gas from the passage 42 flows into the center passage of the mixer through the sloping passageways 72 to exert an aspirator action which produces a partial vacuum in the center passage if there is no oxygen being supplied to the center passage. If oxygen is flowing in the center passage, then the action of the fuel gas jets flowing through the sloping passageways 72 is to increase the oxygen flow.

Beyond the sloping passageways 72, the gases enter a space which serves as a mixing chamber 78 and the gases flow with sufficient turbulence to insure thorough mixing as they travel through the tip 14 on their way to the tip face 80 from which they are discharged through one or more orifices in the tip face.

The mixer 46 and the bushing 48 have sealing rings 84 and 86, preferably O-rings, for preventing leakage of gases within the torch. Since the fuel gas is turned on first, the aspirator action of the sloping passageways 72 prevents any fuel gas from flowing back into the oxygen passage or into the powder passage during normal operation of the torch. When the oxygen is turned on, the aspirator nozzle 50 creates a suction which further prevents any flow of gases in the torch back into the powder passage 52 or the hopper.

In the event that the discharge of gas from the tip is obstructed, by having the tip strike against an object, or from other causes, the pressure build-up in the tip may prevent aspirator action at the passageways 72 and the nozzle 50 and the normal flow of gases within the torch can be completely disorganized. Under such circumstances, explosions sometimes occur within the torch.

In order to prevent the force of an explosion in the torch body from reaching the powder 36, there are openings 90 around the circumference of the hopper 30; and these openings 90 are covered with a wire mesh 92 which is fine enough to prevent powder from escaping from the hopper. Any build-up in pressure under the hopper, however, is vented through the wire mesh 92, there being large areas of this wire mesh in proportion to the volume of gas contained within the torch body.

The powder 36 flows from the hopper downward across a conical deflector 94 which is attached to the lower part of the hopper by connections 96 at angularly spaced regions around the deflector 94.

The bottom edge of the deflector 94 has a substantial clearance from the wall of the hopper 30 so that powder flows downward along a lower portion 98 of the hopper wall and at the bottom of the hopper, the powder flows through a metering port 99 into the powder passage 52 which is commanded by the valve consisting of the hose 56 and operator or abutment 60.

In the event of a sudden pressure build-up in the torch, while the powder valve is open, the pressure wave blows back through the metering port 99 and upward around the bottom edge of the deflector 94. The gas of this pressure wave, which is at high velocity in the event of a substantial explosion, blows out through the wire mesh 92.

FIGURE 3 shows a modified construction for obtaining a larger area of mesh for escape of gas pressure without raising the level of the powder hopper on the torch. In FIGURE 3 parts of the construction corresponding to FIGURE 1 are indicated by the same reference characters with a prime appended. A screen 92' is located around the lower part of the hopper 30' as an outer wall of the hopper enclosing a gas space 102 between the wire mesh screen 92' and the outside surface of the hopper 30'. The deflector 94' is of smaller size in FIGURE 3 since the spacing of the upper part of the hopper from the torch body is less than in FIGURE 1.

In the event of an explosion, the pressure wave from the metering port 99' passes under the lower edge of the deflector 94' and discharges into the space 102 since this is in the direct path of the exploding gases. No pressure can build up within the hopper, however, because the gas escapes through the screen 92' as fast as gas flows into th space 102. As in the case of the wire mesh screen 92 of FIGURE 1, the wire mesh screen 92' is of fine mesh, small enough to prevent escape of powder of the particle size with which the hopper is intended to be used.

FIGURES 4 and 5 show a simplified construction for the invention suitable for torches where the volume of gas within the torch, and downstream from the mixer, is small. A hopper 110 screws into an opening 111 at the top of a fitting 112. Powder falls from the hopper 110 into a chamber 114 in the fitting 112; and there is a metering port 116 at the lower end of the chamber 114 leading to a diverging outlet 118 from which the power discharges into a body 120' of the torch.

A valve 122 controls the discharge of powder from the outlet 118. This valve is different from the valve shown in FIGURE 1 and consists of an interference blocking escape of powder from the outlet 118.

There are openings 124 through the side wall of the fitting 112 at angularly spaced locations around the circumference of the fitting 112. A cylindrical screen 126 fits into the chamber 114 and is supported by a shoulder 128 at the lower end of the chamber. This screen 126 is of a mesh fine enough to prevent flow of powder out through the openings 124; but it permits escape of gas from within the fitting 112 whenever there is a rise in pressure in the fitting higher than the pressure of the ambient atmosphere outside of the fitting 112.

The fitting 112 screws into a threaded opening 130 in the top of the torch body 120. The fitting 112 can be made to move up and down with respect to the valve 122 by rotating the fitting 112 in the threads 130. Since the outlet 118 is an integral part of the fitting 112, upward movement of the fitting raises the outlet 118 away from the valve 122 and opens up a clearance for the flow of powder 131 around the valve 122 as shown in FIGURE 6.

Rotation of the fitting 112 in the other direction brings the end face of the outlet 118 into contact with the circumference of the valve 122 and shuts off flow of powder. The valve 122 preferably has a plastic coating for contact with the outlet 118, which is usually made of metal, to seal the outlet against leakage of powder.

FIGURE 5 shows an indicator 134 on the top surface of the torch body 120, and indicia 136 at angularly spaced locations around the circumference of the fitting 112 for indicating the extent to which the fitting has been rotated in the threaded opening, and its relative position with respect to the valve 122. A rubber plug 140 (FIGURE 4) is held against the threads of the fitting 112 by a set screw 142 to provide friction for holding the fitting 112 in any set position to which it is turned to provide a desired rate of powder flow to the torch.

The preferred embodiments of the invention have been illustrated and described, but changes and modifications can be made and some features can be used in different combinations without departing from the invention as defined in the claims.

What is claimed is:
1. In a torch that has a hopper and a passage through which powder from the hopper is fed into the torch and discharged through flame jet orifices of a tip of the torch, a chamber along a portion of said passage having a wall formed of fine mesh screen that blocks discharge of powder from the passage, the screen extending around most of the circumferential angular extent of the passage and providing a substantial open area for the escape from the powder passage of any pressure built up in the passage and thus providing an explosion-proof hopper.

2. The torch described in claim 1 characterized by the torch having a gas passage therein for the flow of fuel gas and combustion-supporting gas to the tip, the powder passage leading from the hopper and communicating with said gas passage, the screen wall being at a location along the powder passage and upstream from the region at which the powder mixes with the fuel gas and the combustion supporting gas.

3. The torch described in claim 2 characterized by the powder passage including an enlarged chamber having the screen wall along the enlarged chamber portion of the passage, and a baffle in the chamber along which the powder flows as it travels away from the hopper, a baffle having a downstream surface that deflects any back flow of gas radially outward into contact with the screen portion of the wall.

4. The torch described in claim 3 characterized by the baffle constituting a conical surface with its axis substantially coincident with the center line of the chamber and with the conical surface of the baffle being the surface along which the powder flows, the powder passage being restricted beyond the baffle to a cross section less than the under side of the baffle and the lower end of the baffle being in position to deflect back flow of gas from the restricted cross section radially outward in the chamber and into contact with the screen of said wall.

5. The torch described in claim 4 characterized by the screen wall being conical and confronting the conical surface of the baffle and spaced therefrom to provide clearance for the flow of powder.

6. The torch described in claim 1 characterized by the chamber being located adjacent to the hopper and having a portion that extends upward above the bottom of the hopper and outside of the hopper and outward from the powder passage to increase the area of the screen.

7. The torch described in claim 6 characterized by the chamber including a portion that extends upward around the outside of the hopper with the screen wall spaced from the hopper and forming, in effect, a double side wall of the hopper for a part of the side thereof.

8. The torch described in claim 7 characterized by the hopper having a bottom outlet constituting a part of the powder passage, and a deflector below said bottom outlet with a sloping surface that spreads the powder radially for flow along the outer portion of that part of the chamber through which the powder flows, the lower end of the deflector being in position to deflect back flow of gas radially outward into upper portions of the chamber around the outside of the hopper.

9. The torch described in claim 8 characterized by the torch having a body and a handle portion, a valve for controlling the flow of powder from the hopper, an operating handle for the valve in position for convenient manipulation by the hand that holds the torch, the hopper being carried by the torch body ahead of the handle portion and having a generally conical shape of larger cross section toward its upper end, and the screen wall having substantially the same general conical shape as the portion of the hopper along which the screen extends.

10. In a torch that has a hopper and a passage through which powder from the hopper is fed into the torch and discharged through flame jet orifices of a tip of the torch, a chamber along a portion of said passage having a wall formed of fine mesh screen that blocks discharge of powder from the passage but that vents any pressure built up in the passage, characterized by the passage being a tubular element extending upward from the torch and having an opening through a side thereof, and the wall formed of fine mesh screen being in position to stop escape of powder from said opening while leaving an open area for escape of gas pressure in the event of an explosion in the torch.

11. The torch described in claim 10 characterized by there being a plurality of openings through the side of the tubular element at angularly spaced locations around the circumference of said tubular element, and the wall of fine mesh screen being a hollow cylinder having an outside diameter substantially equal to the inside diameter of the tubular element and extending across all of said openings, and a shoulder in the chamber on which the lower end of the hollow cylinder is supported.

12. The torch described in claim 10 characterized by said passage extending through the tubular elements and having a discharge outlet at its lower end, a valve element with which the discharge outlet contacts to stop powder flow to the torch and to prevent back pressure from the torch from reaching the passage above the valve element, the tubular element being connected to the torch by a threaded connection and being rotatable in said threaded connection to move the tubular element toward and from the valve element and thus put the portion of the passage with the opening and the fine mesh screen out of and into communication with the interior of the torch beyond the valve element.

References Cited

UNITED STATES PATENTS

| 3,190,560 | 6/1965 | Schilling et al. | 239—345 X |
| 3,252,628 | 5/1966 | Broderick et al. | 239—85 X |

FOREIGN PATENTS

| 38,6719 | 4/1928 | Denmark. |

M. HENSON WOOD, JR., *Primary Examiner.*

M. Y. MAR, *Assistant Examiner.*

U.S. Cl. X.R.

239—345, 583